United States Patent [19]
Anderson

[11] Patent Number: 5,974,546
[45] Date of Patent: Oct. 26, 1999

[54] APPARATUS AND METHOD TO DETERMINE CAUSE OF FAILED BOOT SEQUENCE TO IMPROVE LIKELIHOOD OF SUCCESSFUL SUBSEQUENT BOOT ATTEMPT

[75] Inventor: Eric D. Anderson, North Hudson, Wis.

[73] Assignee: Micron Electronics, Inc., Nampa, Id.

[21] Appl. No.: 08/853,308

[22] Filed: May 8, 1997

[51] Int. Cl.[6] ................................................... G06F 11/34
[52] U.S. Cl. ............................................. 713/2; 713/202
[58] Field of Search ....................................... 395/652, 700, 395/830, 750, 182.5; 713/202, 2

[56] References Cited

U.S. PATENT DOCUMENTS

| | | | |
|---|---|---|---|
| 5,564,054 | 10/1996 | Bramnick et al. | 395/700 |
| 5,615,330 | 3/1997 | Taylor | 395/182.5 |
| 5,634,137 | 5/1997 | Merkin et al. | 395/830 |
| 5,710,930 | 1/1998 | Laney et al. | 395/750 |
| 5,732,268 | 3/1998 | Bizzarri | 395/652 |

Primary Examiner—Dennis M. Butler
Assistant Examiner—Omar A. Omar
Attorney, Agent, or Firm—Dorsey & Whitney LLP

[57] ABSTRACT

The present invention relates to an apparatus and method for improving the probability of a successful, subsequent attempt to boot a computer system after a failed system boot. The method comprises the steps of: (a) identifying a cause of the failed system boot; and (b) modifying parameters related to an identified cause of a failed system boot and/or taking evasive action based on an identified cause of a failed system boot.

35 Claims, 6 Drawing Sheets

APPARATUS AND METHOD TO DETERMINE CAUSE OF FAILED BOOT SEQUENCE TO IMPROVE LIKELIHOOD OF SUCCESSFUL SUBSEQUENT BOOT ATTEMPT

TECHNICAL FIELD

The present invention relates to rebooting a computer after a failed boot attempt. More specifically, the present invention relates to a method for determining the cause of an unsuccessful boot attempt to improve the probability of a successful subsequent boot attempt.

BACKGROUND

Figure 1:
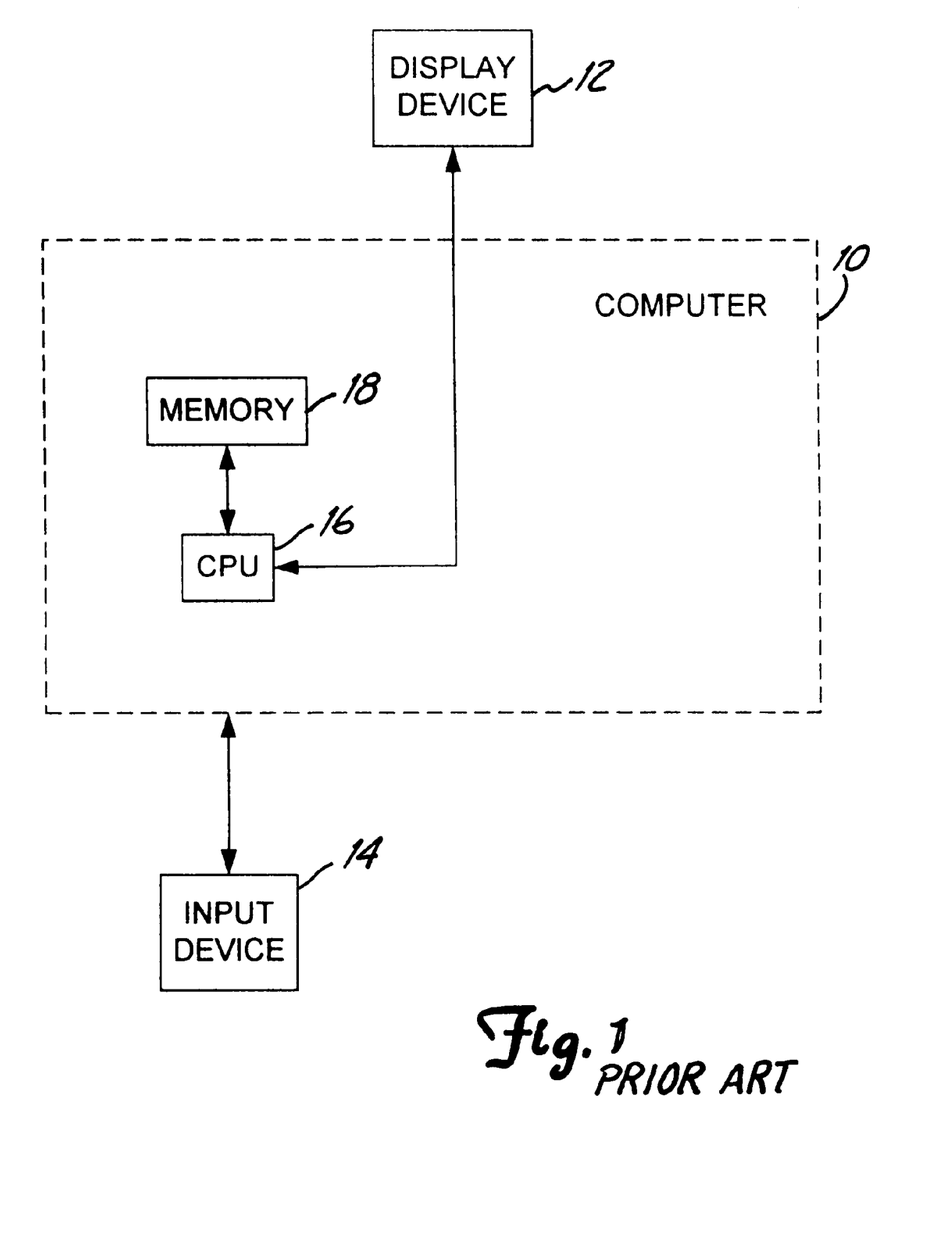
FIG. 1 shows a block diagram of a prior art computer system.

FIG. 1 shows a conventional computer 10 having a video display 12, such as a CRT monitor, and an input device 14, such as a keyboard. The computer 10 has a central processing unit ("CPU") or microprocessor 16 and memory 18. The microprocessor 16 executes programs that reside within the memory 18 of the computer 10.

Description of BIOS Program

When a conventional personal computer 10 is first turned on, a Basic Input/Output System ("BIOS") is enabled. A BIOS program 24 (see FIG. 2) is a set of programs usually stored permanently in a read only memory ("ROM") that provides the most basic control and management of the computer's hardware. When a user turns on the computer 10, the BIOS program 24 conducts a series of complex tests of the devices installed on the computer 10. During run-time, the BIOS program 24 provides the Operating System and application programs with access to these devices.

Figure 2:
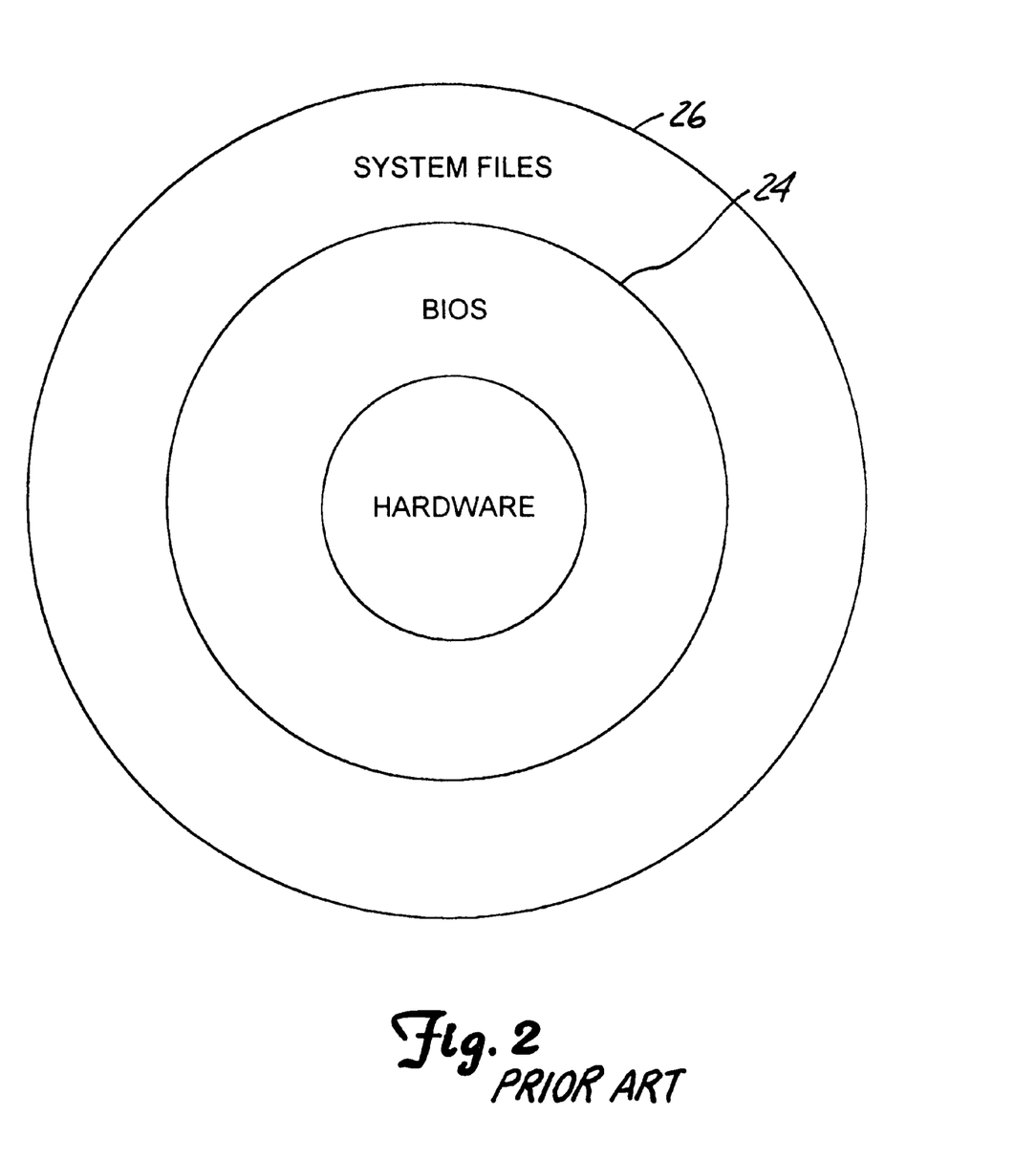
FIG. 2 shows the prior art interrelationship between the hardware, the BIOS program, and the other software on the computer system.

Software is usually designed to operate in layers, and the BIOS program 24 is the lowest software layer in the computer 10 (as shown in FIG. 2). It functions as the interface between the hardware and the other layers of software, isolating them from the specific hardware details. This arrangement enables the user to change certain hardware devices without having to install a new operating system.

The BIOS Program Functions

The BIOS program 24 has two basic functions:

A. Initialize and configure the computer 10

B. Provide run-time BIOS Services

The present invention relates to the first function, in particular, to software inserted in or linked to the BIOS program 24 that operates and modifies the operation of the BIOS program 24 during the initialization and configuration of the computer 10.

FIG. 2 illustrates the second function and the relationship between the system files 26, the BIOS program 24, and the hardware in the computer 10 during run time. The system files 26 are part of the operating system. When the computer 10 is started, the system files 26 are loaded in memory 18, usually random access memory. The system files 26 form a unified set of routines for controlling and directing the computer's operations. The system files 26 interact with the BIOS program 24 which is copied into random access memory ("RAM") 18 from the ROM for execution of runtime services. The BIOS program 24 links requests made from the system files 26 to the hardware.

Initialize and Configure the Computer

The first job of a BIOS program 24 is to initialize and configure the computer hardware when the user turns on the computer 10 ("system boot"). The BIOS program 24 runs a startup program called the POST program, which performs a number of tasks, including:

Test Random Access Memory (RAM)

Conduct an inventory of the hardware devices installed in the computer

Configure hard and floppy disks, keyboard, and serial and parallel ports

Configure other devices installed in the computer such as CD-ROM drives and sound cards Initialize computer hardware required for computer features such as Plug and Play and Power Management Run Setup if requested If prior tasks are successful, then load and run the Operating System such as DOS, OS/2, UNIX, or Windows '95

In order to perform these tasks, the POST program runs a plurality of separate start-up, diagnostic routines. The POST runs these diagnostic routines on the computer system. If the POST process is successful, then an operating system is loaded onto the computer system, thereby enabling the user to use the computer system. The steps of executing the POST process and loading or booting the operating system is referred to as a "system boot".

When a POST routine fails, the BIOS will not boot the operating system. Thus, if the system boot fails, then the user will not be able to use the computer until the system is booted up successfully. Consequently, once a system boot fails, unless the user wants to turn the computer over for repairs and not retry the system boot, the computer system's configuration needs to be modified to increase the probability of successfully booting up the system.

In the current approach, to maximize the probability of a successful subsequent boot up sequence following a failed system boot, the BIOS determines whether a previous POST was successful, by checking a piece of data, which will indicate whether the previous POST was successful. If the BIOS determines that the previous POST was not successful, the BIOS typically will advise the user that the previous attempt failed, and will attempt to reboot the system using pre-defined default parameters to configure the system and leave some performance features disabled. These default parameters are intended to improve the probability that the computer system will successfully boot up.

However, a problem with this approach is that by using default parameters to configure the entire system, performance parameters for the computer are lowered and fewer features are enabled. Clearly, a BIOS that improves the probability of a successful subsequent system boot without unnecessarily inhibiting specific features and/or performance parameters of the computer system is desirable.

If, on the subsequent attempt to boot, the BIOS is able to complete the POST process, the BIOS will pause at the end of the POST process to give the user the option of continuing the boot process or entering a system utility that enables the user to change certain system parameters and to enable or disable certain system features. If the user selects to continue the boot process, then the system will boot the Operating System and run with less performance and/or fewer features enabled. If the user chooses to enter the system utility, then the user may selectively change, enable, or disable system features and/or performance parameters. Because most computer users are not knowledgeable about the various parameters and are not knowledgeable about the effects of changing the parameters, this option is not helpful to the ordinary user. Although it provides flexibility, the user may have no idea what to do and could end up adjusting parameters in a way that does not improve or unnecessarily hurts system performance. In short, this option is not a convenient, user friendly option for remedying a failed system boot. Clearly, a BIOS which does not rely on the user to selectively change system parameters and improves the probability of a successful subsequent boot after a failed system boot is desirable.

SUMMARY OF THE DISCLOSURE

The present invention relates to an apparatus and method for improving the probability of a successful, subsequent attempt to boot a computer system after a failed system boot. The method comprises the steps of: (a) identifying a cause of the failed system boot; and (b) modifying parameters related to an identified cause of a failed system boot and/or taking evasive action based on an identified cause of a failed system boot.

DETAILED DESCRIPTION OF A FIRST EMBODIMENT

Figure 3:
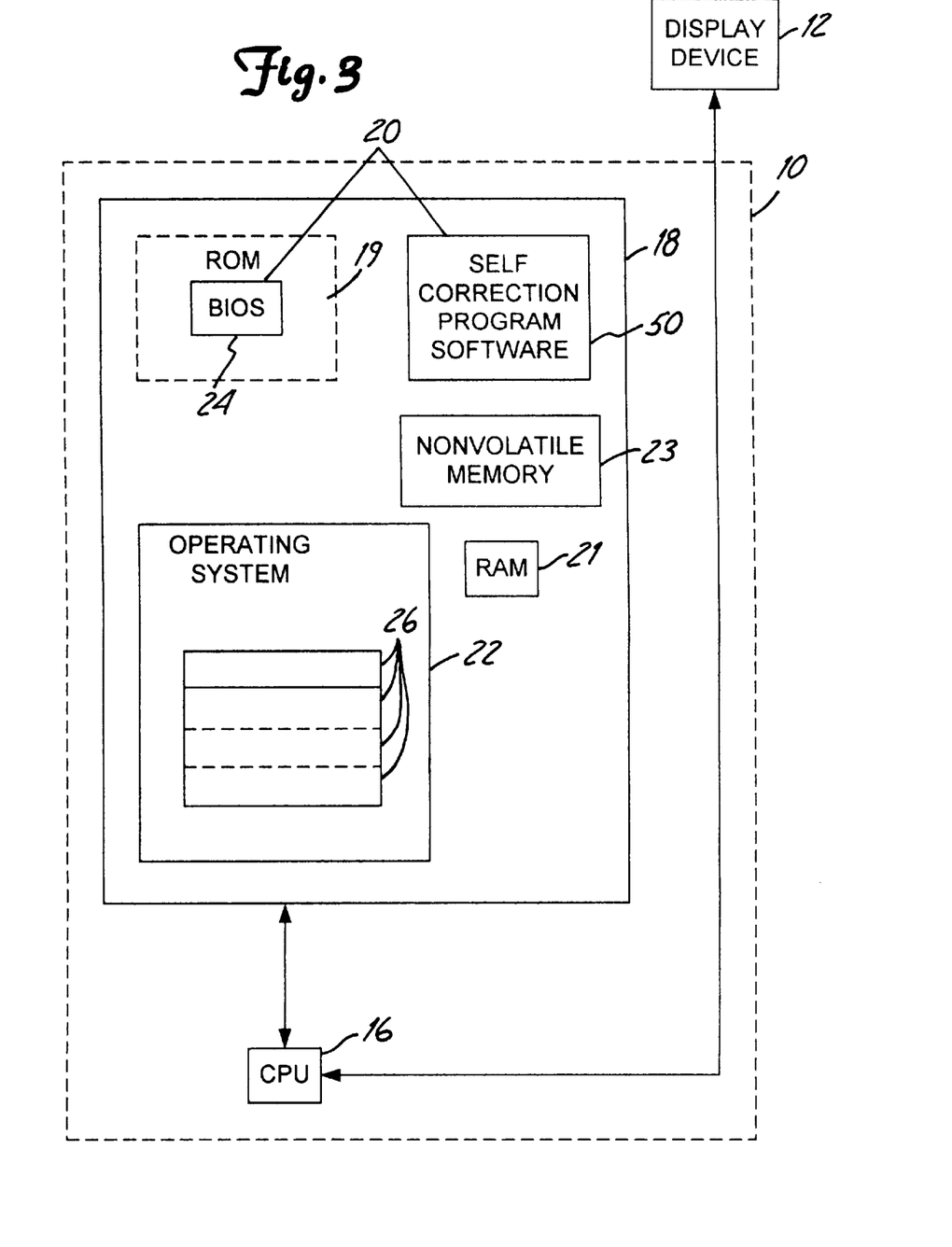
FIG. 3 shows a block diagram of a portion of a computer system and its relationship to the present invention.
Figure 4A:
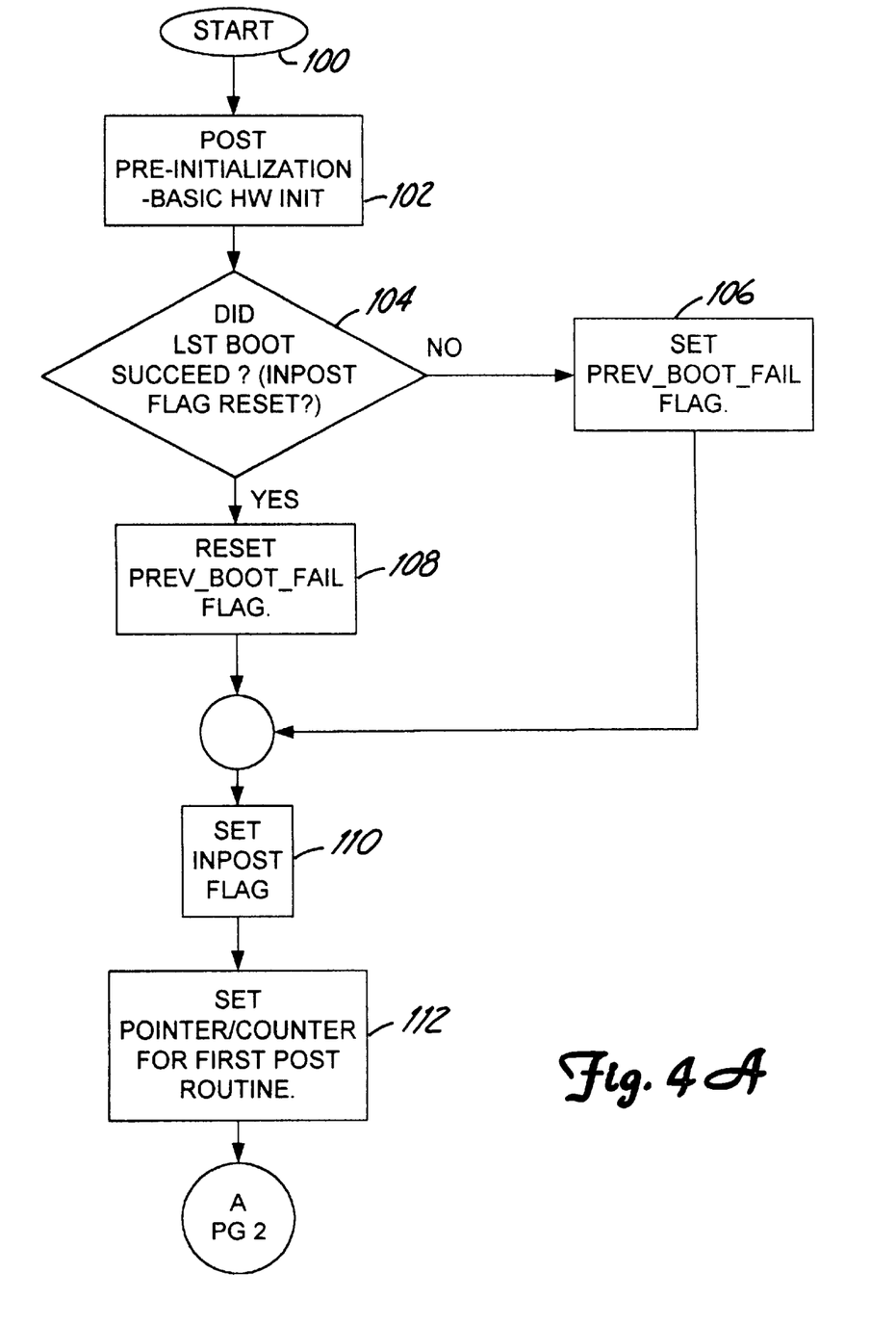
FIGS. 4A and 4B are flow charts of the steps performed by the present invention.
Figure 4B:
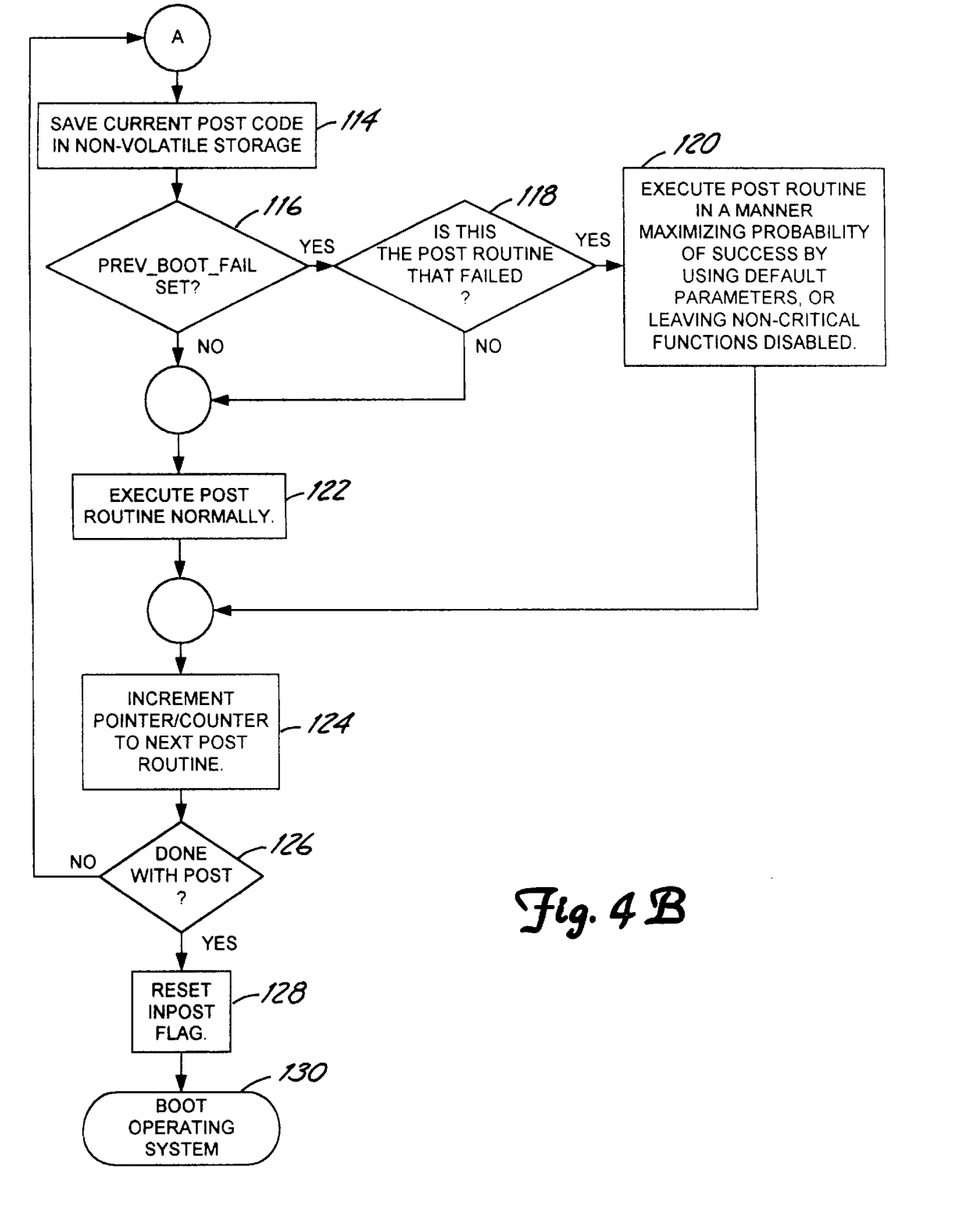
Figure 5:
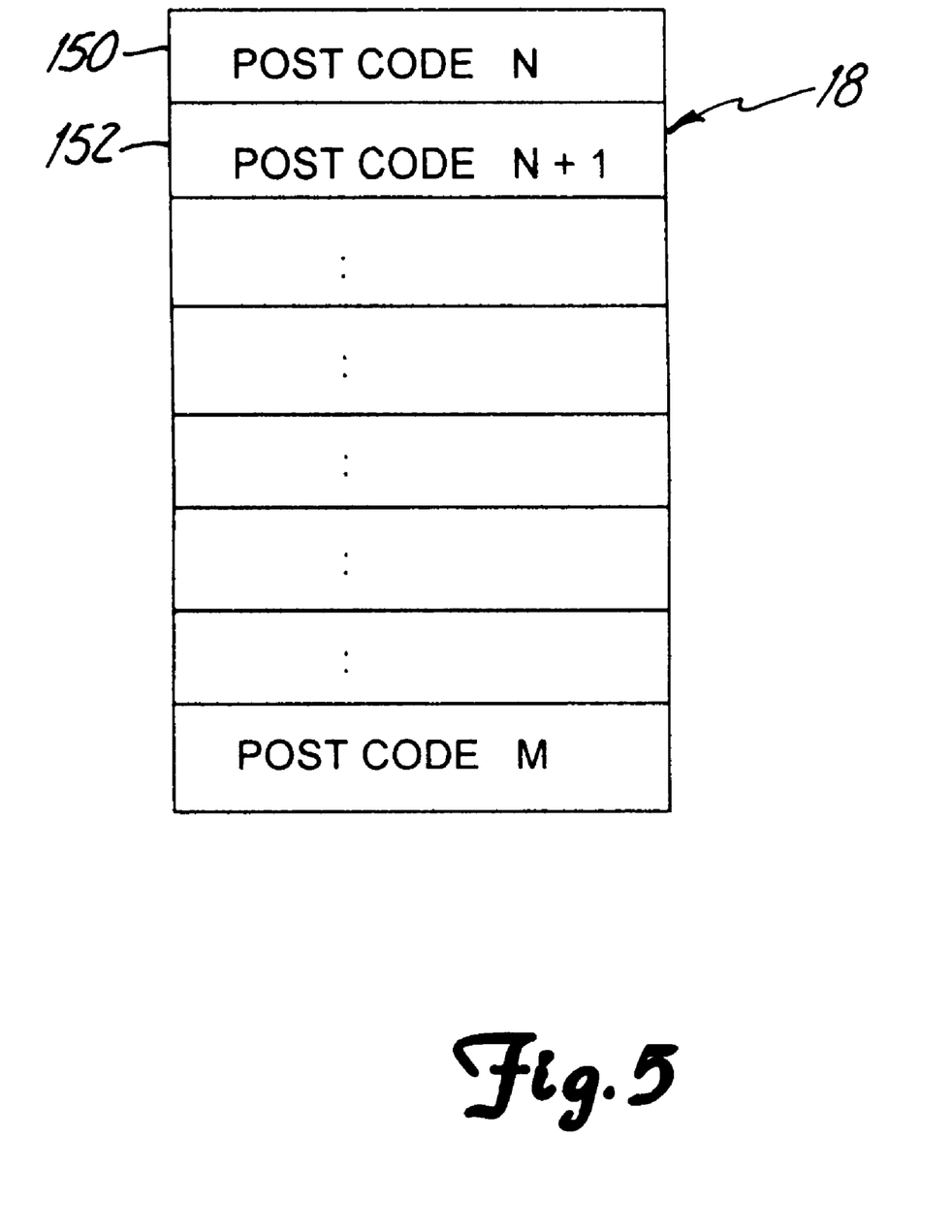
FIG. 5 shows a block diagram of a nonvolatile memory section having a plurality of memory locations.

With reference to FIGS. 3–5, an apparatus and method to (1) determine the cause of a failed system boot; and (2) selectively choose the appropriate corrective or evasive action for the subsequent system boot, such as disabling or otherwise modifying specific features or performance related functions will be described.

FIG. 3 shows a more detailed block diagram of the computer 10 shown in FIG. 1. As shown in FIG. 3, the computer 10 comprises a microprocessor or a central processing unit ("CPU") 16 and memory 18.

Microprocessor and Memory

The microprocessor 16 used in the present invention may be any general purpose microprocessor 16, including but not limited to, an Intel 80X86 (i.e., Pentium™ processor). The microprocessor 16 executes the programs that reside within memory 18 of the computer 10.

As shown in FIG. 3, the microprocessor 16 is connected to the memory 18. In the present invention, memory 18 includes read only memory 19, random access memory ("RAM") 21, and non-volatile random access memory ("non-volatile memory") 23. Non-volatile memory 23 may be implemented with CMOS static RAM ("SRAM") or NMOS SRAMs.

Memory 18 contains a plurality of start-up programs 20 and the boot-up portions of an operating system 22, which comprise a plurality of system files 26. Two such start-up programs 20 are the Self-correction Program 50 of the present invention and the BIOS program 24. In one embodiment, the BIOS program 24 is a commercially available product that is purchased and installed by the computer manufacturer into the computer 10. Companies offering PC BIOS software include: Phoenix Technologies, Ltd.; Award Software International, Inc.; AMI; and SystemSoft Corporation.

As described previously, when a user turns on the computer 10, the BIOS program 24 runs the POST program, which comprises a plurality of separate, startup, diagnostic routines. The failure of a POST routine will cause the BIOS 24 to be unable to boot the operating system 22. During a subsequent attempt, the software 50 performs a series of steps to determine the cause of a previous failed boot up sequence and to improve the probability of success in a subsequent attempt to boot. Nonvolatile memory 23 is used to store information to allow the software 50 to determine, at the subsequent start-up attempt, which POST routine(s) were the cause of the failure during a previous boot sequence. Based on the cause, the software 50 can take appropriate evasive and/or corrective action in the subsequent start-up boot sequence. In the present invention evasive and/or corrective action includes, but is not limited to, intelligently choosing which specific features to disable or which performance related functions to slow down to attempt to overcome the cause of the failure. That is, the present invention provides an apparatus and method to (1) determine the cause of a failed system boot; and (2) selectively perform the appropriate corrective or evasive action for the subsequent system boot, such as disabling or otherwise modifying specific features or performance related functions. This action improves the chance for success of that subsequent system boot.

In particular, the present invention (1) recovers a POST code from nonvolatile memory for the routine which failed during the previous BIOS POST process, and (2) takes corrective or evasive action relative to the failed routine during the subsequent attempt to reboot the system. Thus, by determining the cause of the previous failed attempt to boot the system, the present invention improves the probability of a successful subsequent system boot while selectively choosing modifications to the particular POST routine that caused the failure during the previous system boot and leaving other routines unchanged.

Computer Software 50

With reference to FIGS. 4A and 4B, the software 50 of the present invention will be described. The present invention relates to computer software 50 (referred to as a "Self Correction Program" in FIG. 3) stored with or linked to the BIOS program 24 that operates on the microprocessor 16 in conjunction with the BIOS program 24 during initialization and configuration to provide a self correcting BIOS program 24. In one embodiment, the Self Correction Program software 50 is part of the BIOS program 24. FIGS. 4A and 4B are flow charts showing the steps performed by the software 50 in conjunction with the BIOS program 24 to (1) determine the cause of a previously failed system boot ("failure causation identifier"); and (2) based on that analysis, selectively modify specific features and/or system parameters responsive to the cause of the failure during a previous system boot ("startup routine modifier"). A suitable commercially available BIOS program 24 to which the present invention may be adapted is the BIOS program from Phoenix Technologies, Ltd.

FIGS. 4A and 4B are flow charts showing the steps performed by the Self Correction Program computer software 50 of the present invention operating on the microprocessor 16. As will be described in greater detail, the basic functions of the invention are 1) when a system boot fails, to store causal information that is preserved for use during a subsequent system boot attempt, (2) to retrieve the information, and (3) to use it for system configuration modifications that increase the chance of success in the next system boot attempt.

Determine Cause of a Previously Failed System Boot

In order to determine the cause of a previously failed system boot during a subsequent system boot attempt, the present invention (1) stores causal information that is preserved when a system boot fails for the next system boot attempt; and (2) retrieves the preserved information. The first act to determine the cause of a previously failed system boot occurs during the failed system boot attempts.

As described previously, the user turns on the computer 10. At block 100, the BIOS program 24 starts the BIOS POST process. At block 102, the BIOS POST program runs a pre-initialization routine in which the basic hardware attached to the microprocessor 16 is initialized. At block 104, the software 50 determines whether the previous attempt to boot up the system failed ("previous boot status determiner"). This determination is made by checking in nonvolatile memory 23 a first boot status indicator or first status flag called INPOST. This flag indicates whether the previous attempt to boot the system failed. If the INPOST flag is set, then the previous attempt to boot the system failed. If the INPOST flag is not set, then the previous attempt to boot succeeded.

Based on the status of the INPOST flag, a second boot status indicator or second status flag called the PREV_BOOT_FAIL flag is set (or not set). At block 106, if the previous attempt to boot did not succeed (i.e., the INPOST flag is set), then the PREV_BOOT_FAIL flag is set, thereby indicating that the previous attempt to boot the system failed. However, at block 108, if the previous attempt to boot succeeded (i.e., the INPOST flag is not set), then the PREV_BOOT_FAIL flag is not set or is reset, thereby indicating that the previous attempt to boot the system succeeded.

At block 110, the INPOST flag is set as a determiner, in case the present system boot sequence fails. If the present attempt to boot the system ultimately fails, then the INPOST flag will indicate that on the subsequent boot. However, as will be described later, if this present attempt to boot progresses to the end and succeeds, then the INPOST flag will be reset. Thereby, during a subsequent boot attempt, the INPOST flag will indicate that this boot attempt succeeded.

At block 112, a pointer or counter is set to point to the first POST routine to be executed. As will be described later, if the POST routine that the pointer is pointing to executes normally (i.e., does not fail), then the pointer will advance to point to the next POST routine to be executed.

As shown in FIG. 4B, the following acts are performed for each POST routine to be executed during the POST process. At block 114, a POST code, which identifies the POST routine to be executed, is saved in non-volatile memory 23. Each POST routine is assigned an arbitrary 8 bit identifier, which is referred to as the POST code. The current POST code indicates which routine or which particular stage of the POST process is being run on the computer. By saving this POST code in nonvolatile memory 23, if the boot attempt fails during this POST routine, then the POST code saved in the non-volatile memory 23 will be the POST code identifying the POST routine that caused the system boot to fail. Thus, at block 114, by saving the POST code of the POST routine to be executed in non-volatile memory 23 (1) causal information relating to the failure of a system boot is saved; and (2) this causal information is preserved for use during a subsequent system boot attempt, because the information is stored in non-volatile memory 23. As will be explained later, this stored information relating to which POST routine caused the system boot to fail will allow the software 50 to take evasive action such as to selectively choose which specific features to disable or otherwise modify or which performance related functions to slow down or otherwise modify to improve the probability of booting.

With reference to FIG. 5, two ways the POST code identifying the failed POST routine may be saved in non-volatile memory 23 will be described. To illustrate the first approach, FIG. 5 shows a section of nonvolatile memory 23 having a plurality of memory locations numbered 1 to N. These memory locations are initialized to zero when a successful system boot occurs. During the execution of a system boot and prior to the execution of each POST routine, the POST code for that routine is saved in a non-volatile memory location. That is, the POST code for the first POST routine to be executed will be saved in a first memory location 150. If the first POST routine is executed successfully, then the POST code corresponding to the next POST routine to be executed is saved in the next available memory location 152. If a POST routine fails to execute properly, then the computer system will fail to boot.

During a subsequent boot, the INPOST flag will be set, thereby indicating to the BIOS that the previous attempt to boot the system failed. Because the previous attempt to boot the system failed, the software 50 can determine (by looking for the last non-zero value) the cause of the failed system boot. This value corresponds to the POST code that was the last POST code saved in nonvolatile memory. In a failed system boot attempt, the last POST code saved identifies the POST routine that failed. This POST code is preserved for use during a subsequent boot.

In this embodiment, a record of POST routines that have caused failure of a system boot may be compiled by storing in a separate nonvolatile memory location the last saved POST code during a failed system boot. A record of all POST routines that have caused failure can be of significant value to a repair person, particularly if the full pattern of failed and successful routines can be observed.

In the second approach, during a system boot, one memory location is used to save the current POST code only. In this approach during the execution of a system boot and prior to the execution of a POST routine, the POST code assigned to the first POST routine to be executed is saved in a first memory location N 150. If the first POST routine executes properly and there is another POST routine to be executed, then the POST code corresponding to this next POST routine to be executed is saved in the first memory location 150. If a POST routine fails, then the system boot fails (i.e., the INPOST flag is set and the value in memory location 150 identifies the particular POST routine causing failure).

During a subsequent system boot, the POST code corresponding to the current POST routine to be executed is stored in a separate location such as the second memory location N+1 152. Because the previous attempt to boot the system failed, the software 50 can determine the cause of the failed system boot by determining which POST code was last saved in the first memory location 150. In a new system boot attempt, the last POST code saved in the memory location 150 identifies the POST routine that failed in the prior attempt. This POST code may be preserved in this memory location 150 or moved to a separate memory location allocated for preserving POST codes corresponding to POST routines that caused a system boot to fail.

In most situations, the computer will likely have no problems with a POST routine until it gets to the routine corresponding to the POST code that is stored in location N 150. When that routine is executed, some parameters may be modified, or some evasive action might be taken. If that routine then succeeds, then the BIOS will continue, storing POST codes in location N+1 152. If the POST fails this subsequent boot, there will be two POST codes saved, and two routines that will be executed differently on the second subsequent boot. Also, on the second subsequent boot, POST codes will be stored in non-volatile memory location N+2 154.

This process would be repeated until the POST ultimately succeeds, or a given POST routine cannot be modified sufficiently to allow the POST to succeed. If the computer succeeds in booting, there will be a record in non-volatile memory of the POST routines that were modified in order to complete the POST. This record of modified POST routines could be stored on disk, or somehow be processed and/or stored in a more permanent fashion. A record of all POST routines that have caused failure can be of significant value to a repair person, particularly if the full pattern of failed and successful routines can be observed.

The amount of non-volatile storage required to allow implementing this with no restrictions is one byte for each POST routine in a worst case scenario. However, a computer that requires every POST routine to be massaged is probably not going to boot anyway. Roughly speaking, if three or four bytes were available to a system implementing the aforementioned algorithm, that would probably be sufficient. Some sort of geometric equation would describe the probability of a given system requiring N POST routines to be modified to allow it to boot.

Alternatively, one non-volatile memory location may be used to store POST codes. In this embodiment, only one routine could be modified on a subsequent boot.

Returning to the flowchart of FIG. 4B, at block 116, the software 50 determines whether the second status flag (i.e., the PREV_BOOT_FAIL flag) has been set (i.e., whether the PREV_BOOT_FAIL flag indicates that the previous attempt to boot the system failed). If the previous attempt to boot has failed (i.e., the PREV_BOOT_FAIL flag is set), then the software determines whether the next POST routine to be executed was the routine that failed during the previous boot. This determination is made by checking if the POST code for the POST routine to be executed is the same as the time-of-failure POST code saved in nonvolatile memory during the previous boot attempt.

Modifying Parameters Related to the Identified Cause of the Failed Boot System

Continuing to refer to FIG. 4B, the steps performed to automatically modify parameters related to the identified cause of the failed boot system will be described. At step 120, if the POST routine to be executed is the one that failed during the previous attempt to boot the system, then this POST routine is executed only after selectively modifying parameters for this POST routine such as (1) disabling a special feature; (2) slowing down or otherwise modifying performance related functions; and/or (3) disabling a non-critical function. This evasive action or corrective measure is predetermined and provided for each POST routine that can be modified. For example, if a POST routine that checks for correct functionality of a parallel port has failed, the parallel port can be disabled. Consequently, in response to the software 50 identifying a POST routine that caused a system boot to fail, the present invention may take an evasive or corrective action appropriate to the time-of-failure POST routine during a subsequent system boot.

In addition, each POST routine may be modified in a plurality of ways. That is, each POST routine may have more than one potential modification that could solve the failure of the system boot. When a POST routine has more than one modification, a counter could be implemented to track the number of modifications that were made to a particular POST routine to allow it to succeed. This tracking would allow for sequencing through a combination of performance parameters, rather than simply backing off to some defaults.

For instance, one of the POST routines may be responsible for executing option ROMS. An option ROM, as is well known in the art, is a program which typically configures and controls a specific hardware device in a personal computer. For purposes of this example, the POST routine has three option ROMS to execute. If, during a particular system boot attempt, one of the three option ROMS is executed, and the executed option ROM causes the system to "lock up", then the counter could keep track of which option ROM was executed. Based on the counter, during a subsequent system boot attempt, the option ROM that caused the "lockup" could be skipped.

However, if, at block 116, the previous boot attempt did not fail (i.e., the PREV_BOOT_FAIL flag is not set) or if, at block 118, the POST routine to be executed did not fail during the previous boot attempt and no fault has subsequently developed, then, at block 122, the POST routine to be executed is executed normally. The acts described in blocks 116, 118, 120, and 122 allow for corrective or evasive action to be taken in a new system boot in response to the POST routine(s) that failed during a previous system boot by limiting modifications to the routine(s) that failed during a previous system boot. The present invention 50 improves the probability of a successful subsequent system boot, while limiting the number of modifications made to aid a successful boot.

Next, at block 124, the pointer or counter is incremented to point to the next POST routine to be executed. Then, at block 126, the software 50 determines whether all of the routines in the POST process have been executed. If another POST routine must be executed, then the acts described at blocks 114–124 are performed for each POST routine remaining to be executed, unless or until a failure occurs. However, if the POST process has been completed, then, at block 128, the INPOST flag is reset, thereby indicating that the POST attempt was successful. At block 130, the operating system 22 is booted. These acts improve the probability of success that a subsequent boot attempt will succeed following a failed boot attempt. In addition, these acts allow the BIOS to select, in response to the particular POST routine(s) that fail, which specific features to disable or otherwise modify and which performance related functions to slow down or otherwise modify.

The embodiment described above assumes that the subsequent system boot, following a failed system boot, will succeed, at least to the extent of progressing past the POST subroutine causing the prior failure. However, the POST codes for each routine that fails during each boot sequence may be stored and preserved in a separate location in nonvolatile memory. Thus, each time a system boot is attempted, based on the POST codes preserved in the nonvolatile memory as POST codes of routines that have caused a system boot to fail, the software of the present invention will take corrective and/or evasive action for the POST routines identified by these POST codes. Thus, the corrective/evasive action grows increasingly complex in response to the various POST subroutine failures encountered, but the response to each failure is tailored to the particular POST subroutine that failed.

Also, a log of all the POST codes that caused the system boot to fail may be kept in non-volatile memory and retrieved, so that once the system boot succeeds (with the help of a diagnostic tool), a person will be able to access this log and determine the various problems that need to be addressed.

Although the description of the preferred embodiment has been presented, it is contemplated that various changes may be made without deviating from the spirit of the present invention. Accordingly, it is intended that the scope of the present invention not be limited strictly to that of the description of the preferred embodiment of the present invention.

I claim:

1. A method performed by a computer system for improving the probability of a successful, subsequent attempt to boot the computer system after a failed system boot, the method comprising the steps of:
   (a) identifying a cause of the failed system boot wherein the act of identifying comprises:
      (1) assigning identifiers corresponding to the start-up routines that are executed during a system boot; and
      (2) storing the start-up routine identifier corresponding to the start-up routine that fails during a system boot for retrieval during the subsequent system boot; and
   (b) automatically performing at least one of modifying parameters related to an identified cause of a failed system boot and taking evasive action based on an identified cause of the failed system boot.

2. The method of claim 1, wherein the act of assigning a start-up routine identifier comprises assigning a Power On Self Test ("POST") code, wherein each POST code corresponds to a particular POST routine.

3. The method of claim 1, wherein the act of modifying comprises altering the parameters for the start-up routine that failed during a previous system boot.

4. The method of claim 1, wherein the act of taking evasive action comprises disabling at least one feature relating to the start-up routine that caused the failed system boot.

5. The method of claim 3, wherein the act of altering comprises the step of setting performance parameters for the system relating to the start-up routine that caused the failed system boot.

6. The method of claim 1, wherein the act of storing the start-up routine identifier corresponding to the start-up routine that failed during a system boot is performed by storing the start-up routine identifier in non-volatile memory.

7. The method of claim 6, wherein the non-volatile memory comprises at least one memory location.

8. The method of claim 7, wherein the act of storing the start-up routine identifier assigned to the start-up routine that failed during a system boot comprises storing in a separate memory location each start-up routine identifier of a start-up routine that failed during a system boot.

9. A memory device, located within a computer system, storing computer instructions for improving the probability of a successful, subsequent attempt to boot the computer system after a failed system boot, the memory device storing:
   (a) computer instructions for identifying a cause of the failed system boot wherein the stored cause identifying computer instructions comprise:
      (1) computer instructions for identifying a corresponding start-up routine that is executed during a system boot; and
      (2) computer instructions for storing the start-up routine identifier corresponding to the start-up routine that failed during a system boot in memory for retrieval during the subsequent system boot; and
   (b) computer instructions responsive to the cause identifying computer instructions that automatically perform at least one of modifying parameters related to a cause of the failed system boot and taking evasive action based on a cause of a failed system boot.

10. The memory device of claim 9, wherein the stored start-up routine identifier is a Power On Self Test ("POST") code, wherein each POST code corresponds to a particular POST routine.

11. The memory device of claim 9, wherein the stored computer instructions for modifying comprise:
   computer instructions for altering the parameters for the start-up routine that failed during a previous system boot.

12. The memory device of claim 9, wherein the stored computer instructions for taking evasive action disable at least one feature.

13. The memory device of claim 11, wherein the stored computer instructions for altering alters the parameters for the start-up routine that failed during a previous system boot by setting performance parameters for the system.

14. The memory device of claim 9, wherein the stored computer instructions for storing the start-up routine identifier corresponding to the start-up routine that failed during a system boot comprise computer instructions for storing the start-up routine identifier in non-volatile memory.

15. The memory device of claim 14, wherein the stored computer instructions for storing a start-up routine identifier comprise computer instructions for storing each start-up routine identifier corresponding to each start-up routine that failed during a system boot in a separate memory location.

16. A method for implementing a self correcting Basic Input/Output System ("BIOS"), the method comprising:
   (a) storing, prior to execution of a start-up routine, a start-up routine identifier which uniquely identifies the next start-up routine to be executed by the BIOS;
   (b) identifying the start-up routine that caused a previous system boot to fail, during a subsequent system boot, based on at least one stored start-up routine identifier; and
   (c) automatically performing at least one of modifying parameters of the identified start-up routine before executing the identified routine during the subsequent system boot and taking evasive action related to the identified start-up routine during the subsequent system boot.

17. A self-correcting Basic Input/Output System ("BIOS") located on a BIOS memory operating on a processor during a system boot, the BIOS memory comprising:
   (a) computer instructions for determining whether a previous system boot was successful;
   (b) computer instructions for identifying a cause of the failed system boot, wherein the computer instructions for identifying a cause of the failed system boot comprise:
      (1) computer instructions for identifying a corresponding start-up routine that is executed during a system boot; and
      (2) computer instructions for storing on a memory the start-up routine identifier corresponding to the start-up routine that failed during a system boot for retrieval during the subsequent system boot; and
   (c) computer instructions responsive to the cause identifying computer instructions that automatically performs at least one of modifying parameters related to a cause of the failed system boot and taking evasive action based on a cause of the failed boot system.

18. The self-correcting BIOS of claim 17, wherein the computer instructions for determining whether a previous system boot was successful comprise a first status flag for indicating whether the previous attempt to boot the computer system was successful.

19. The self-correcting BIOS of claim 18, further comprising:
   (a) computer instructions for modifying the first boot flag in response to the execution of a system boot; and
   (b) memory for storing the first status flag for retrieval during a subsequent system boot.

20. The self-correcting BIOS of claim 19, wherein, at the start of the execution of a system boot and prior to modifying the first status flag, at least a portion of the information from the first status flag is transferred to a second status flag.

21. The self-correcting BIOS of claim 19, wherein the first status flag indicator is stored in nonvolatile memory.

22. The self-correcting BIOS of claim 17, wherein the start-up routine identifier is a Power On Self Test ("POST") code, wherein each POST code corresponds to a particular POST routine.

23. The self-correcting BIOS of claim 17, wherein the computer instructions for modifying comprise:
   computer instructions for altering the parameters for the start-up routine that failed during a previous system boot.

24. The self-correcting BIOS of claim 17, wherein the computer instructions for taking evasive action comprise computer instructions for disabling at least one feature.

25. The self-correcting BIOS of claim 23, wherein the computer instructions for altering alters the parameters for the start-up routine that failed during a previous system boot by setting performance parameters for the system.

26. The self-correcting BIOS of claim 17, wherein the start-up routine identifier corresponding to the start-up routine that failed during a system boot is stored in non-volatile memory.

27. The self-correcting BIOS of claim 26, wherein the non-volatile memory comprises at least one memory location.

28. The self-correcting BIOS of claim 27, wherein each start-up routine identifier corresponding to each start-up routine that failed during a system boot is stored in a separate memory location.

29. A computer system, comprising:
   (a) a display device;
   (b) memory;
   (c) a processor connected to the display device and the memory;
   (d) computer instructions located on a second memory operable by the processor, during a system boot, for determining whether a previous system boot was successful;
   (e) computer instructions located on the second memory operable by the processor, during a system boot, for identifying a cause of a failed previous system boot, wherein the computer instructions for identifying a cause of the failed system boot comprise:
      (1) computer instructions for identifying a corresponding start-up routine that is executed during a system boot; and
      (2) computer instructions for storing on a memory the start-up routine identifier corresponding to the start-up routine that failed during a system boot for retrieval during the subsequent system boot; and
   (f) computer instructions located on the second memory operable by the processor, during a system boot, for automatically performing at least one of modifying parameters related to a cause of a failed system boot and taking evasive action based on identified cause of a failed system boot.

30. A method performed by a computer system for improving the probability of a successful, subsequent attempt to boot the computer system after a failed system boot, the method comprising the steps of:
   (a) identifying a cause of the failed system boot, wherein the act of identifying comprises:
      (1) assigning a start-up routine identifier to a start-up routine executed during a system boot; and
      (2) storing the start-up routine identifier corresponding to each start-up routine executed during the system boot;
      (3) recognizing, during a subsequent system boot, the last start-up routine identifier that was stored during the previous failed system boot; and
   (b) automatically performing at least one of modifying parameters related to an identified cause of a failed system boot and taking evasive action based on an identified cause of the failed system boot.

31. The method of claim 30, further comprising the step of preserving, for use during subsequent system boot attempts, the last start-up routine identifier that was stored during previous failed system boots.

32. A memory device, located within a computer system, storing computer instructions for improving the probability of a successful, subsequent attempt to boot the computer system after a failed system boot, the memory device storing:
   (a) computer instructions for identifying a cause of the failed system boot, wherein the stored cause identifying computer instructions comprise:
      (1) computer instructions forming a start-up routine identifier for identifying a corresponding start-up routine executed during a system boot;
      (2) computer instructions for storing the start-up routine identifier corresponding to each start-up routine executed during the system boot in memory; and
      (3) computer instructions for recognizing, during a subsequent system boot, the last start-up routine identifier that was stored in memory during the previous failed system boot; and
   (b) computer instructions responsive to the cause identifying computer instructions that automatically perform at least one of modifying parameters related to a cause of the failed system boot and taking evasive action based on a cause of a failed system boot.

33. The apparatus of claim 32, further storing computer instructions for preserving, for use during subsequent system boot attempts, the last start-up routine identifier that was stored in memory during the previous failed system boot.

34. A self-correcting Basic Input/Output System ("BIOS") located on a BIOS memory, operating on a processor during a system boot, the BIOS memory comprising:
   (a) computer instructions for determining whether a previous system boot was successful;
   (b) computer instructions for identifying a cause of the failed system boot, wherein the cause identifying computer instructions comprise:
      (1) start-up routine identifier instructions for identifying a corresponding start-up routine executed during a system boot;

(2) computer instructions for storing on a memory the start-up routine identifier corresponding to each start-up routine executed during the system boot; and (3) computer instructions for recognizing, during a subsequent system boot, the last start-up routine identifier that was stored in memory during the previous failed system boot; and (c) computer instructions responsive to the cause identifying computer instructions that automatically perform at least one of modifying parameters related to a cause of the failed system boot and taking evasive action based on a cause of a failed system boot.

35. The self-correcting BIOS of claim 34, further comprising a memory for preserving, for use during subsequent system boot attempts, the last start-up routine identifier that was stored in memory during the previous failed system boot.

* * * * *